Figure 1:
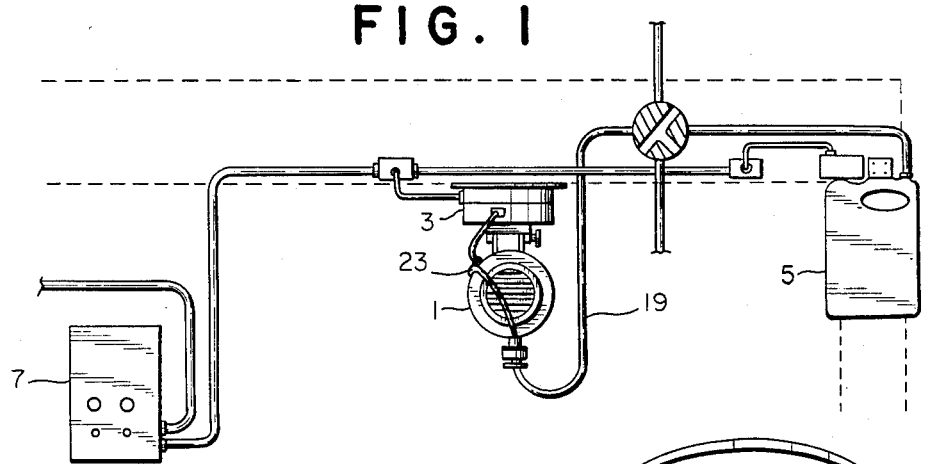
Figure 2:
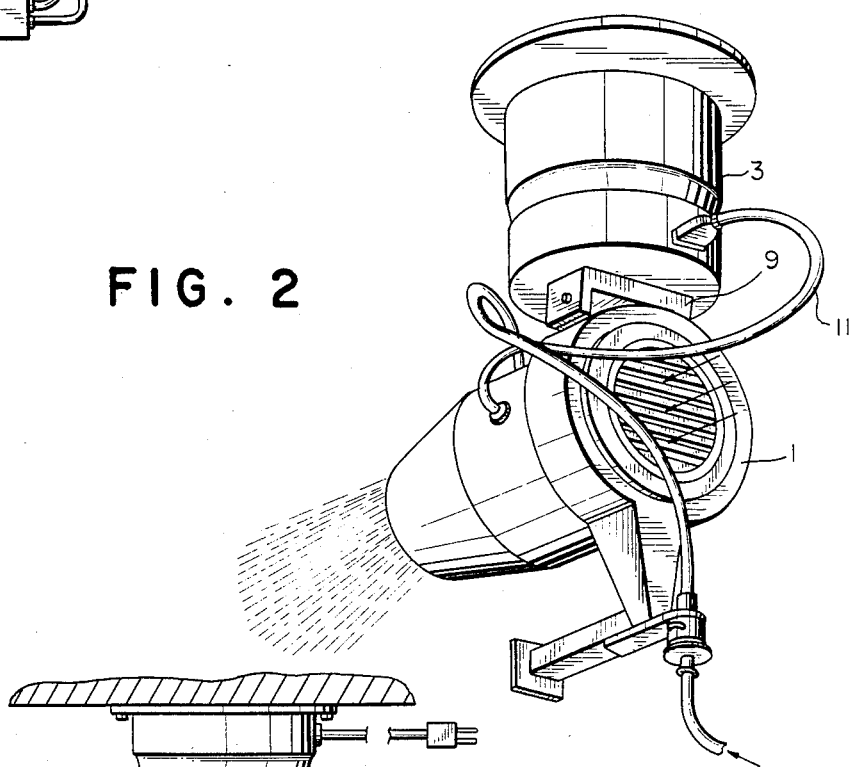
Figure 3:
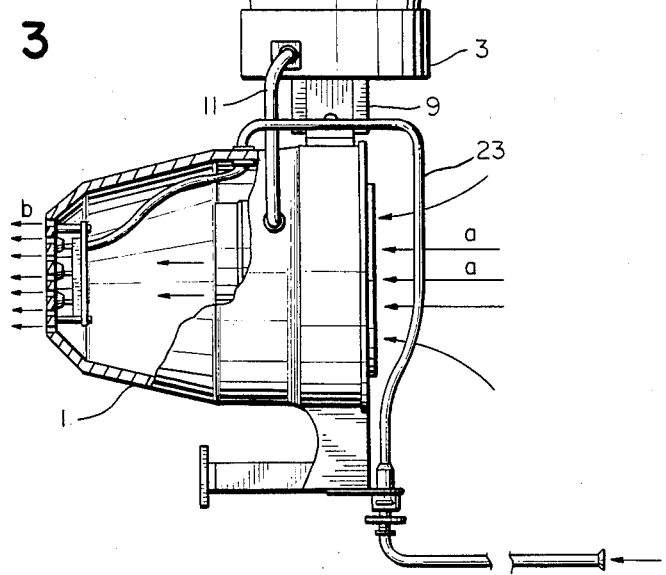
Figure 4:
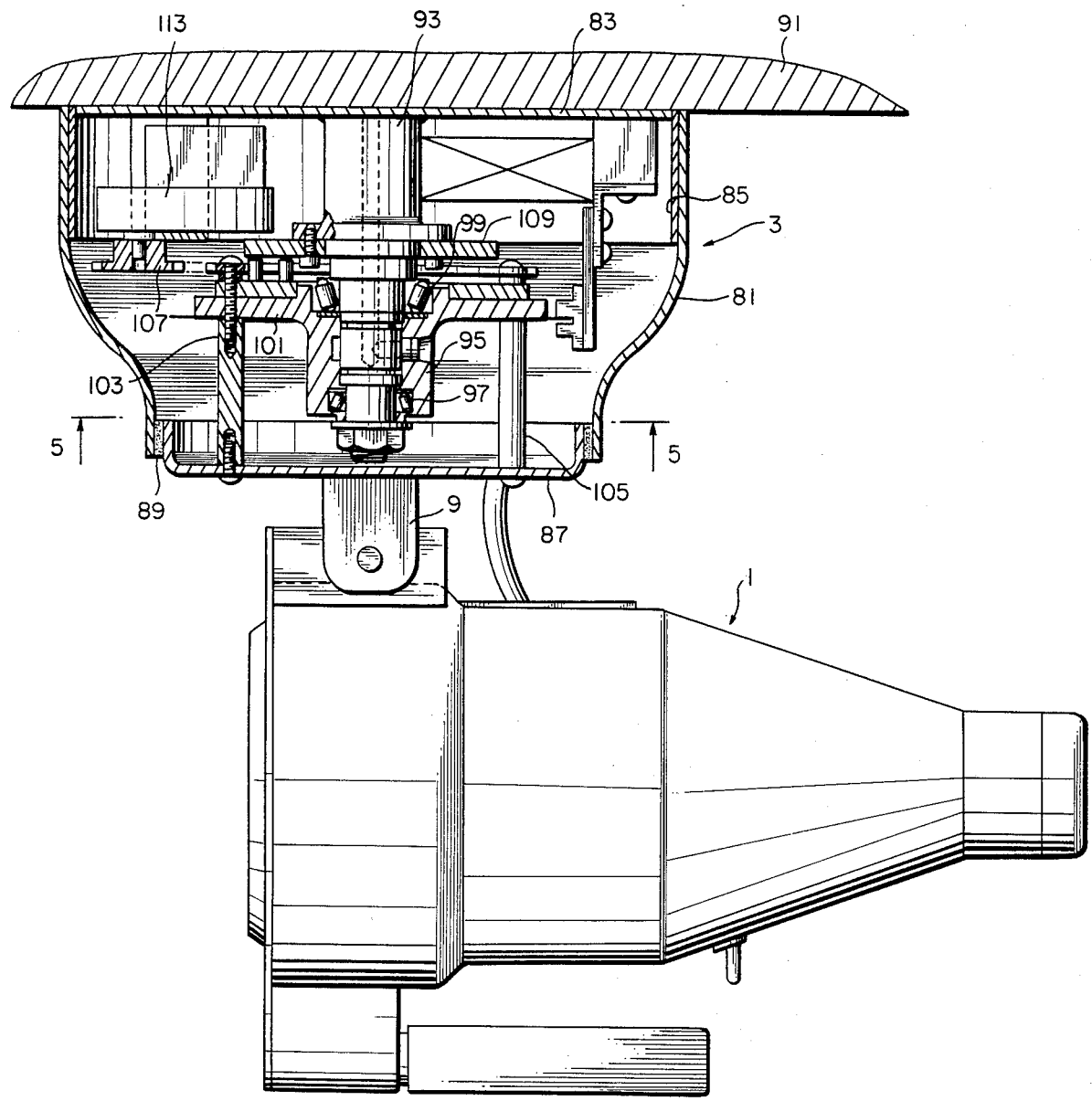
Figure 5:
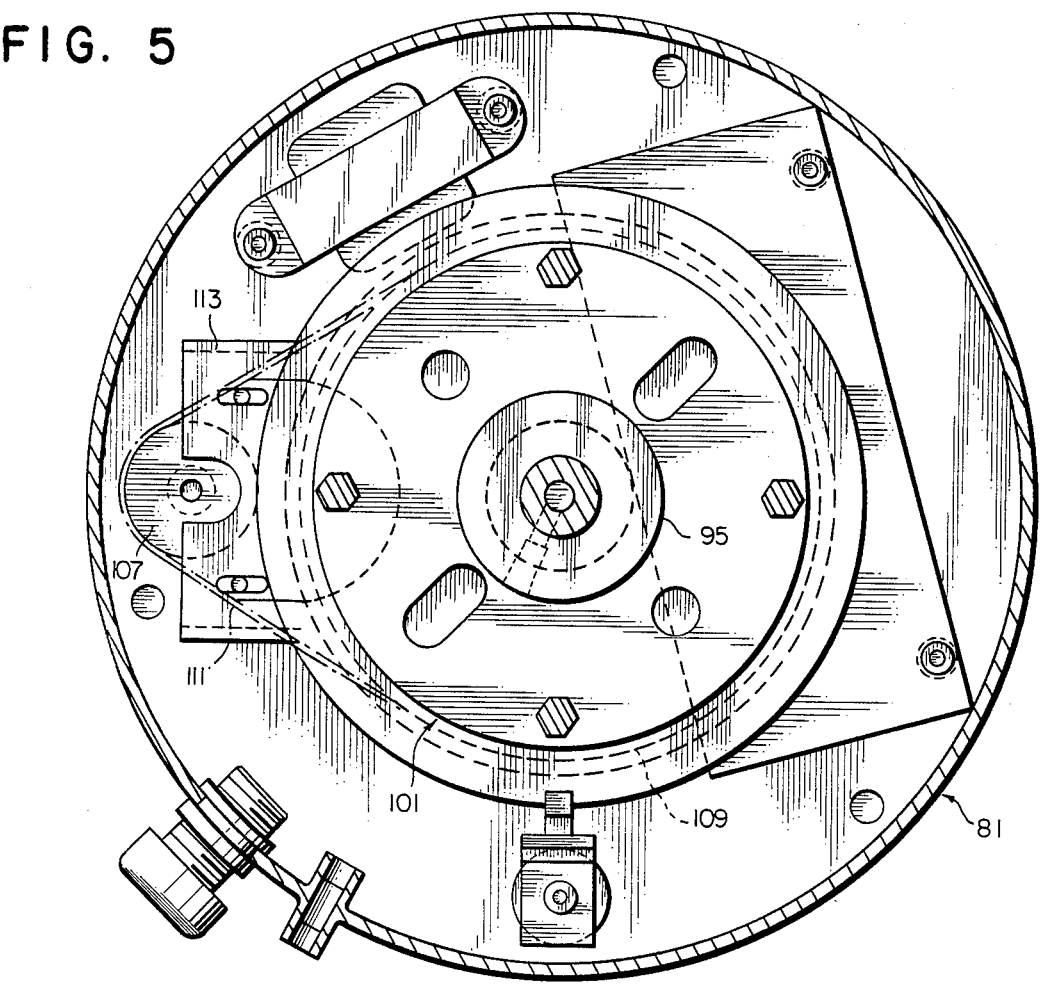
Figure 6:
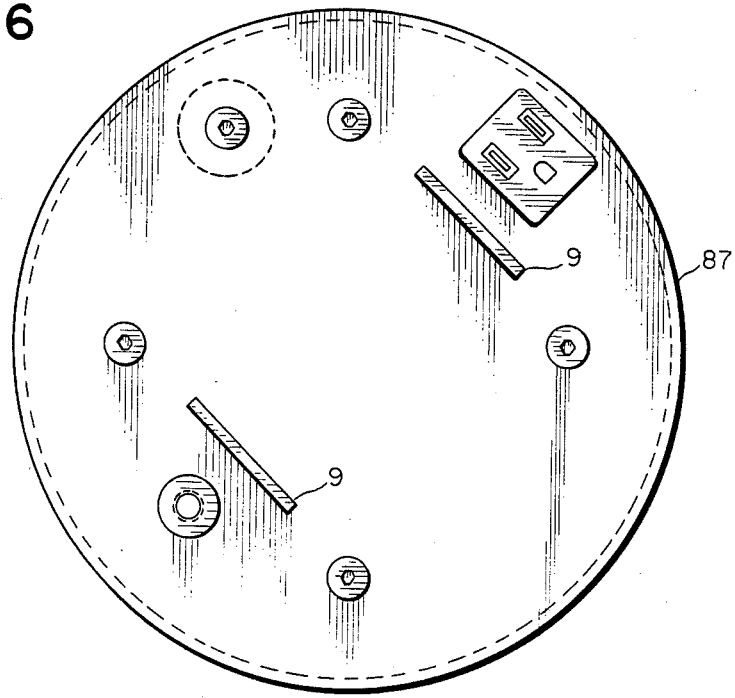

United States Patent [19]

Lefebvre et al.

[11] Patent Number: 4,721,246

[45] Date of Patent: Jan. 26, 1988

[54] VAPORIZATION SYSTEM

[75] Inventors: Gaston Lefebvre, Florimont; Denis Chamberland, Dorion, both of Canada

[73] Assignee: Microspray International Inc., Quebec, Canada

[21] Appl. No.: 779,570

[22] Filed: Sep. 24, 1985

Related U.S. Application Data

[63] Continuation-in-part of Ser. No. 682,988, Dec. 18, 1984, abandoned, which is a continuation of Ser. No. 409,928, Aug. 20, 1982, abandoned.

[51] Int. Cl.$^4$ ............................................. B05B 3/10
[52] U.S. Cl. ........................................ 239/70; 43/900; 108/103; 108/139; 239/226; 239/263.1; 239/264; 248/349
[58] Field of Search ............... 248/349; 108/20, 103, 108/139; 239/225, 263, 264, 70, 236, 142, 263.1; 43/124, 129, 900; 119/16, 159, 160; 366/279, 326; 285/279

[56] References Cited

U.S. PATENT DOCUMENTS

| | | | |
|---|---|---|---|
| 2,168,807 | 8/1939 | Schlupmann | 239/225 X |
| 2,415,194 | 2/1947 | Roselund | 239/264 |
| 2,587,965 | 3/1952 | Campbell | 239/124 X |
| 2,705,171 | 3/1955 | Ziherl | 239/399 |
| 3,653,340 | 4/1972 | Bugg | 108/103 X |
| 4,272,019 | 6/1981 | Halaby, Jr. | 239/70 X |

FOREIGN PATENT DOCUMENTS 1358657 3/1964 France ..................... 108/139

*Primary Examiner*—Andres Kashnikow
*Attorney, Agent, or Firm*—Schwartz, Jeffery, Schwaab, Mack, Blumenthal & Evans

[57] ABSTRACT

The disclosure describes a system for spraying an insecticide or the like, automatically and for a given period of time. The system includes a spray applicator mounted on a rotary table so as to direct a spray of insecticide all around the axis of the rotary table upon rotation of the latter. The rotary table includes a housing with a rotatable base, which is fixed at the top, a shaft extending in the housing and maintained fixed with respect to the housing. The base should be rotatable with respect to the housing. A rotatable sleeve is mounted at the bottom of the fixed shaft and is operatively connected to the rotatable base. A gear arrangement which is motor operated causes rotation of the sleeve and thereby rotates the base. An insecticide which is preferably mixed continuously is continuously fed to the spray applicator. An electrical control is provided for the feeding of the spray applicator while the latter is in operation to produce a rotary spray possibly covering the entire area of an enclosure, such as a barn. Such control can also be adapted to automatically produce a spray at a given time of the day and for a definite period of time. This system provides an efficient application of insecticide and is not harmful to humans.

7 Claims, 6 Drawing Figures

VAPORIZATION SYSTEM

This application is a continuation-in-part of application Ser. No. 682,988 filed Dec. 18, 1984, now abandoned, wehich was a continuation of application Ser. No. 409,928, filed on Aug. 20, 1982, now abandoned.

BACKGROUND OF THE INVENTION (a) Field of the Invention

This invention relates to a system for spraying an insecticide or the like inside an enclosure, such as a barn. More particularly, the invention is concerned with an arrangement which permits an automatic spraying of an insecticide or the like in a barn, for a given period and at a time of the day when workers are not inside the barn, such as at night.

(b) Description of Prior Art

It is well known that insects, more especially those which are found in barns can be extremely harmful to animals. This is the reason why it is essential to have a program for spraying insecticides in the environment where the animals spend an important part of their time. It is also known that certain insecticides may be harmful to humans while being acceptable for the animals. Therefore, the application of an insecticide inside a barn often implies precautionary measures, such as masks or the like. Preferably it would be desirable to introduce the insecticide in the atmosphere of a barn while the workers are not there. Of course, this is not simple, and to this date it is not believed that this can be done very easily.

However, certain types of insecticides can be applied in the presence of animals, such as some insecticides based on pyrethrum and water. The system according to the invention is specially designed to improve the efficiency and the ease of application of these types of insecticides.

SUMMARY OF THE INVENTION

It is an object of the present invention to provide a system which enables to successfully apply an insecticide in an environment where animals spend an important part of their time.

It is another object of the present invention to provide an arrangement which enables to apply the insecticides without risking that a human being would inhale possibly harmful vapours.

It is another object of the invention to provide an automatic system which makes it possible to automatically introduce a spray of insecticide inside a barn at a given time of the day and for a predetermined period.

In accordance with the invention, there is provided a system for spraying an insecticide or the like inside an enclosure which comprises in combination:

(a) a single spray applicator;

(b) a rotary table capable of carrying complete continuous revolution about axis thereof, said rotary table comprising a housing having a top and a base, said housing being fixed at the top thereof, a shaft axially extending in said housing and maintained fixed with respect to said housing means enabling said base to be rotatable with respect to said housing, a rotatable sleeve mounted at the bottom of said fixed shaft, said sleeve being operatively connected to said rotatable base, means to cause rotation of said sleeve and thereby rotating said rotatable base;

(c) means for mounting said spray applicator on said base so as to enable said spray applicator to direct a continuous spray of insecticide or the like all around the axis of said rotary table following rotation of said spray applicator;

(d) means for feeding an insecticide or the like to said spray applicator;

(e) control means enabling to feed said insecticide or the like to said spray applicator while the latter produces a continuous circular spray inside the enclosure.

In accordance with a preferred embodiment of the invention, the control means are automatic so as to produce a rotary spray of insecticide for a given period of time. Preferably, the automatic control means are associated with means enabling the rotary spray to be applied at a given time of the day.

In accordance with another embodiment of the invention, the system comprises a container to contain the insecticide or the like and a duct connecting the container to said spray applicator.

BRIEF DESCRIPTION OF DRAWINGS

The invention is illustrated without limitation thereto, by means of the annexed drawings in which:

FIG. 1 is a view showing various parts of a system according to the invention;

FIG. 2 is a perspective view of the spray applicator mounted on a rotary table;

FIG. 3 is a side view showing the combination illustrated in FIG. 3 mounted on a ceiling;

FIG. 4 is a cross-section view of the rotary table connector to a spray applicator;

FIG. 5 is a section taken along line 5—5 of FIG. 4; and

FIG. 6 is a view of the underside of the rotatable base.

DESCRIPTION OF PREFERRED EMBODIMENTS

With reference to the drawings, it will be seen that the system according to the invention basically comprises a spray applicator 1, a rotary table 3 on which the spray applicator 1 is mounted in known manner, an insecticide container 5 as well as a control panel 7.

The spray applicator 1 can be of any type which is well known to those skilled in the art. In the system which has been illustrated, the spray applicator is one which is as described in U.S. Pat. No. 2,705,171, which is incorporated herein by reference. Basically, it is a combination of a venturi tube and some whirling means to produce the discharge of a fog. In essence, air is forced to the spray applicator in the direction indicated by the arrows a and introduces a mist as shown by the arrows b.

The spray applicator 1 is mounted in known manner by means of a bracket 9 on a rotary table 3.

The rotary table 3 comprises a housing 81 which has the shape illustrated in FIGS. 4 and 5 of the drawings. The housing 81 has a top 83 which is fixed to the housing by means of collar 85 and a base 87 which is adapted to rotate relative to the housing 81 by means of a sliding means 89. The housing 81 is fixed by means of its top 83 to a ceiling 91 in any known manner.

The rotary table 3 also comprises a shaft 93 which as shown axially extends in the housing 81. As illustrated the shaft is fixedly connected in known manner to the top 83 and extends short of the base 87. As such, because of its connection to the top 83, the shaft is maintained fixed with respect to the housing 81.

Mounted about the bottom portion of the shaft 93, there is a rotatable sleeve 95 which is permitted to freely rotate about the bottom portion of the shaft 93 by means of the bearings 97,99. As illustrated, the sleeve 95 is formed with an outwardly projecting flange 101 which is spacedly bolted to the rotatable base 87 by means of spacer bolts 103,105.

To provoke the rotation of the base 87, via sleeve 95, there is a first gear 107 and a second gear 109 which are operatively connected together by means of a chain 111. The gear 107 is driven by the motor 113.

It will therefore be realised that the housing 81 is fixed, but that the base is rotatable via sleeve 95, gears 107,109 and motor 113 to thereby cause rotation of the spray applicator 1.

It is merely sufficient to electrically connect the two components 1 and 3 together by means of the electrical connection 11. It will therefore be seen that when the power supply is on, the rotary table 3 will cause a corresponding rotation of the spray application 1.

The system according to the invention is connected to a container which is filled with an insecticide which is kept well mixed. The idea is that, in operation, the system will always produce a mist or a fog containing an insecticide at a concentration which is substantially constant.

The container is connected to the spray applicator 1 by means of a duct 19, valve 21 and duct 23.

The system can be manually, electrically or electronically automatically operated and the means to do this are not within the scope of the present invention.

We claim:

1. A system for producing a continuous circular spray of a treating liquid inside an enclosure which comprises in combination, a single spray application, a rotary table capable of making complete continuous revolutions about axis thereof, said rotary table comprising a hollow cylindrically-shaped housing, a top fixedly engaged with respect to the upper periphery of said hollow housing to enable fixed mounting of said housing, a shaft downwardly depending from said top and axially extending in said housing short of lower portion thereof, said shaft being connected to said top to be maintained fixed with respect to said housing, a base mounted at the lower portion, and cooperating means between said lower portion of said housing and said base to enable said base to be freely rotatable relative to said housing, a sleeve mounted at the bottom of said shaft and extending partly up said shaft, bearing means between said sleeve and the lower portion of said shaft to permit free rotation of said sleeve, said sleeve being formed with an outwardly projecting continuous circular flange, bolt means to connect said flange to said freely rotatable base and to enable said base to be rotated upon rotation of said sleeve, motorized means incorporated in said housing to cause rotation of said sleeve thereby rotating said freely rotatable base, and means for mounting said spray applicator on said base so as to enable said spray applicator to direct a continuous spray of a treating liquid all around the axis of said rotary table following rotation of said spray applicator, and means for feeding said treating liquid to said spray applicator.

2. A system according to claim 1, wherein said feeding means are automatic so as to produce a circular spray of insecticide for a given period of time.

3. A system according to claim 2, wherein said automatic feeding means are associated with means enabling the circular spray to be applied at a given time of the day.

4. A system according to claim 3, which comprises a container to contain said insecticide or the like and a first duct connecting said container to said spray applicator.

5. A system according to claim 1, which comprises a first gear mounted inside said housing and operatively connected to a motor, a second housing fixedly connected to said projecting flange, a chain to connect said first and second gears to cause rotation of said sleeve.

6. A system according to claim 5, which comprises brackets mounted on said rotatable base to connect said spray applicator thereon.

7. A system according to claim 1, wherein said treating liquid is an insecticide.

* * * * *